United States Defensive Publication [19] (H) [11] T954,010

Brunner et al. [43] Jan. 4, 1977

[54] METHOD OF COATING OXIDIZED INORGANIC SUBSTRATES WITH POLYIMIDE

[75] Inventors: Friedrich C. Brunner, Sindelfingen; Peter U. Frasch; Friedrich W. Schwerdt, both of Boeblingen; Theodor P. Vogtmann, Holzgerlingen, all of Germany

[73] Assignee: International Business Machines Corporation, Armonk, N.Y.

[21] Appl. No.: 687,965

[22] Filed: May 19, 1976

Related U.S. Application Data

[63] Continuation of Ser. No. 492,319, July 26, 1974, abandoned.

[30] Foreign Application Priority Data

Aug. 24, 1973 Germany ..... 2342801

[51] Int. Cl.$^2$ ..... B05D 3/04; B05D 3/10

[52] U.S. Cl. ..... 427/335; 427/93; 427/407 A; 427/409; 428/447; 428/450; 428/458

[57] ABSTRACT

Substrates with oxidized surfaces, as e.g. $SiO_2$ layers on silicon semiconductors and aluminum surfaces, are wetted with an organic silicon compound, for example, $\gamma$-aminopropyltriethoxysilane dissolved in an organic solvent such as trichlorotrifluoro ethane. The solvent is then removed in a dry atmosphere. The evaporation step can be carried out by suspending the substrate in volvent vapor over a supply of refluxing solvent while cooling the solvent vapor such that fresh, dry solvent vapor continuously passes along the substrate and absorbs traces of moisture. Subsequently, a coating is applied from a solution of a polyamido carbon acid formed of pyromellitic acid anhydride and an aromatic amino component and the polyamido carbon acid is heated to form an adherent layer of polyimide.

12 Claims, No Sheets Drawing,

12 Pages Specification

The file of this unexamined application may be inspected and copies thereof may be purchased (849 O.G. 1221, Apr. 9, 1968).